United States Patent
Demchenko et al.

(10) Patent No.: US 8,875,180 B2
(45) Date of Patent: Oct. 28, 2014

(54) METHOD AND DEVICE FOR CONTROLLING A VIDEO RECEIVER

(75) Inventors: Yuriy Demchenko, Misssissauga (CA); Daryl Schembri, Toronto (CA); Maria Martinez, Woodbridge (CA)

(73) Assignee: Rogers Communications Inc., Toronto, Ontario (CA)

( * ) Notice: Subject to any disclaimer, the term of this patent is extended or adjusted under 35 U.S.C. 154(b) by 397 days.

(21) Appl. No.: 13/045,646

(22) Filed: Mar. 11, 2011

(65) Prior Publication Data
US 2012/0151525 A1 Jun. 14, 2012

Related U.S. Application Data

(60) Provisional application No. 61/421,681, filed on Dec. 10, 2010.

(51) Int. Cl.
| | | |
|---|---|---|
| *H04N 7/10* | (2006.01) | |
| *H04N 7/173* | (2011.01) | |
| *H04N 21/6547* | (2011.01) | |
| *H04N 21/41* | (2011.01) | |
| *H04N 21/482* | (2011.01) | |
| *H04N 21/61* | (2011.01) | |
| *H04N 21/6587* | (2011.01) | |
| *H04N 21/438* | (2011.01) | |

(52) U.S. Cl.
CPC ......... *H04N 21/482* (2013.01); *H04N 21/6547* (2013.01); *H04N 21/4126* (2013.01); *H04N 21/6181* (2013.01); *H04N 21/6587* (2013.01); *H04N 21/4383* (2013.01)
USPC ............................................ 725/39; 725/109

(58) Field of Classification Search
CPC ............ H04N 21/4104; H04N 21/414; H04N 21/4126; H04N 21/41407; H04N 21/4622
USPC ..................................................... 725/39, 109
See application file for complete search history.

(56) References Cited

U.S. PATENT DOCUMENTS

| | | | | |
|---|---|---|---|---|
| 5,995,084 | A * | 11/1999 | Chan et al. ..................... | 345/173 |
| 6,225,976 | B1 * | 5/2001 | Yates et al. ..................... | 345/156 |
| 6,801,191 | B2 * | 10/2004 | Mukai et al. ................... | 345/179 |
| 7,712,125 | B2 * | 5/2010 | Herigstad et al. ............. | 725/141 |
| 8,046,801 | B2 * | 10/2011 | Ellis et al. ...................... | 725/58 |
| 2002/0059599 | A1 * | 5/2002 | Schein et al. ................... | 725/39 |

(Continued)

FOREIGN PATENT DOCUMENTS

EP 2265002 12/2010

OTHER PUBLICATIONS http://gigaom.com/video/google-tv-is-ready-to-change-the-game/ "Google TV is Ready to Change the Game". May 27, 2010.

(Continued)

*Primary Examiner* — James R Sheleheda
(74) *Attorney, Agent, or Firm* — Rowand LLP

(57) ABSTRACT

A method and device for displaying an electronic program guide on a handheld device. The guide includes a plurality of tiles, each tile associated with a television program. The device receives a related content request input through its touchscreen and, in response, sends a related content request message to a gateway server over a wireless network connection, the related content request message includes information identifying one of the plurality of programs. The device receives and displays related media content from the gateway server in reply to the related content request message.

15 Claims, 7 Drawing Sheets

(56) References Cited

U.S. PATENT DOCUMENTS

| | | | |
|---|---|---|---|
| 2005/0028208 A1* | 2/2005 | Ellis et al. | 725/58 |
| 2008/0066099 A1 | 3/2008 | Brodersent et al. | |
| 2008/0282288 A1* | 11/2008 | Heo | 725/39 |
| 2010/0017366 A1 | 1/2010 | Robertson et al. | |
| 2010/0037260 A1 | 2/2010 | Fukuda | |
| 2010/0070997 A1 | 3/2010 | Friedman | |
| 2010/0071021 A1 | 3/2010 | Friedman | |
| 2010/0180298 A1* | 7/2010 | Kim et al. | 725/39 |
| 2010/0198822 A1 | 8/2010 | Glennon et al. | |
| 2011/0161242 A1* | 6/2011 | Chung et al. | 705/347 |
| 2012/0151525 A1* | 6/2012 | Demchenko et al. | 725/39 |

OTHER PUBLICATIONS http://www.multichannel.com/article/449644-Comcast In Talks With TiVo About Premiere.php "Comcast in Talks With Tivo About 'Premiere'", Mar. 3, 2010.

International Search Report dated Jan. 18, 2012, PCT/CA2011/050698.

* cited by examiner

METHOD AND DEVICE FOR CONTROLLING A VIDEO RECEIVER

CROSS-REFERENCE TO RELATED APPLICATIONS

The present application claims priority to U.S. provisional patent application Ser. No. 61/421,681, filed Dec. 10, 2010, and owned in common herewith.

TECHNICAL FIELD

The present disclosure relates to mobile devices and, in particular, to the use of mobile devices to interact with video receivers.

BACKGROUND

Mobile devices have become ubiquitous, with most North American consumers having at least one mobile device. The trend in mobile devices is towards more advanced capable devices such as handheld mobile smartphones, netbooks and, more recently, tablet devices. Tablets in particular are lightweight and provide high resolution large touchscreen capabilities to enable large interactive graphical user interfaces.

Broadcast video, like digital television or IPTV, involves an in-home video receiver that tunes one of the channels broadcast over the cable or satellite network and outputs the tuned channel to a display device, like a TV. Such video receivers are usually controlled and operated by a handheld remote control device. The user interface for operating and controlling the video receiver tends to be rendered on the display device, like the TV. For example, the user interface may include displaying a title bar showing the channel number and program title, an electronic program guide, etc. Typically, the display of this user interface at least partly obscures the display of the program on the tuned channel. In some cases, the video program is rendered in a spatially compressed portion of the screen, such as in a window within the electronic program guide, to facilitate navigation of the electronic program guide while viewing the tuned channel.

It would be advantageous to leverage the features of mobile devices to control and facilitate the viewing of television programs.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

Figure 1:
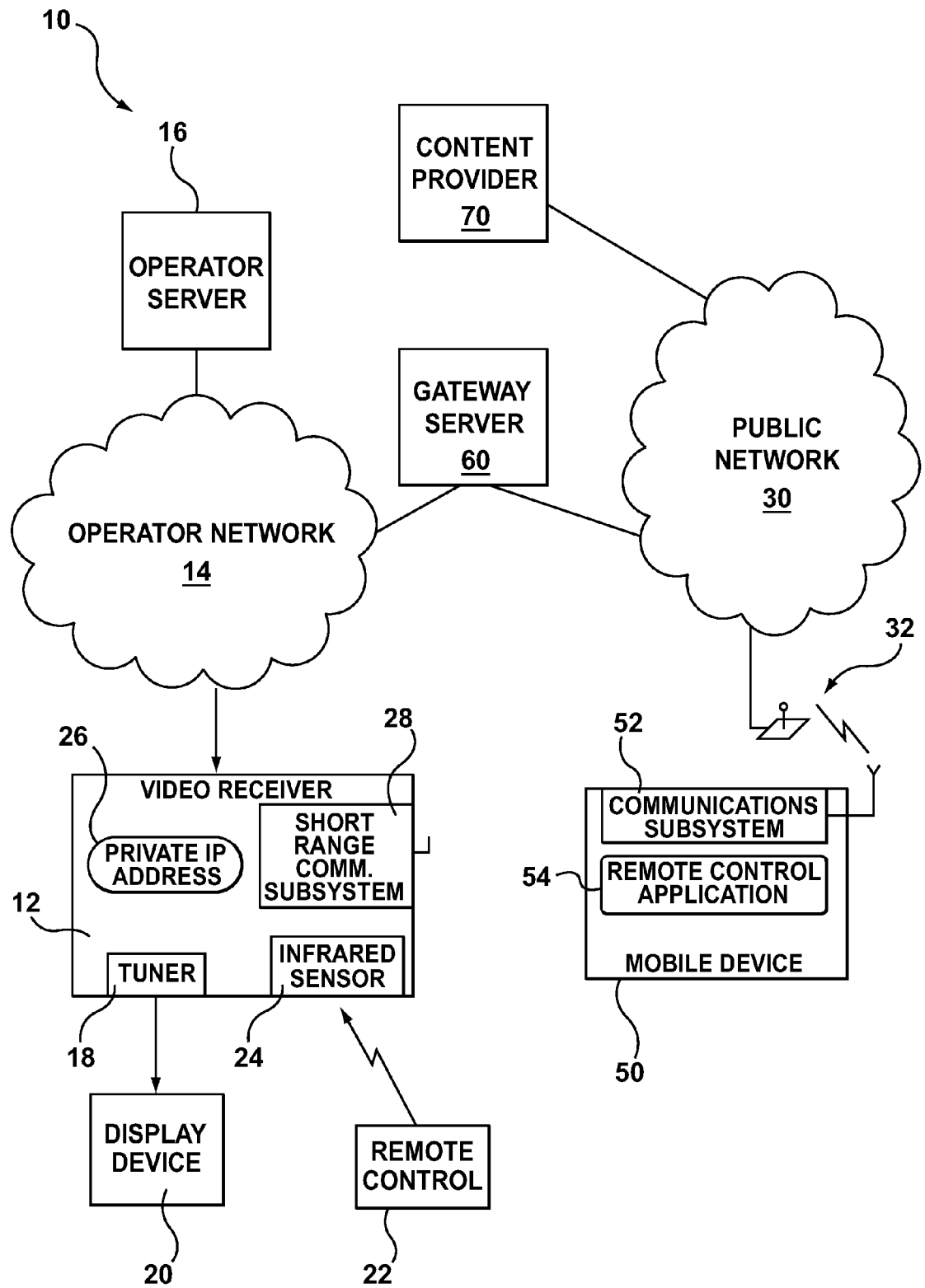
FIG. 1 illustrates an example system for controlling video programs.

The present application describes and discloses a system, device and methods for pairing a mobile device and a video receiver. The mobile device includes a display that renders a graphical user interface (GUI) through which the user may control the video receiver, in the nature of a remote control. The GUI may also provide an interactive program guide (IPG), such as a display of available broadcast or on-demand programming, the channels available, and start times and duration. The IPG may further show images, animations or other visual indicia related to the program on each channel. In some cases the IPG may incorporate interactive applications associated with a selected program, such as games or online ordering applications. In some cases, such applications may be developed using the OpenCable Application Platform (OCAP) or other programming protocols.

In some embodiments, the mobile device is configured to receive an input selecting one of the programs displayed in the IPG. If the program is currently being broadcast the mobile device sends a message to the video receiver instructing the video receiver to tune the corresponding channel for the selected program. If the program is not current being broadcast, the mobile device may offer to instruct the video receiver to tune that channel at the start time for the program, to record the program for later viewing, to display additional information regarding the program, or to tune the channel immediately.

In some embodiments, the mobile device is configured to receive another input selecting one of the programs displayed in the IPG and, in response, to locate and display related content. The related content may include multimedia content, including pre-recorded videos, chat networks, biographical information, or any other media that is related in some manner to the selected program and/or its actors, director, subject-matter, or genre.

In accordance with one aspect, the present application describes a method of obtaining related content. The method includes displaying an electronic program guide including a plurality of tiles, each tile associated with a program; receiving an input command in association with one of the plurality of tiles; determining that the input command is a related content request and, in response, sending a related content request message to a gateway server over a wireless network connection, the related content request message including information identifying said one of the plurality of programs; and receiving and displaying related media content from the gateway server in reply to the related content request message, wherein the related media content is associated with said one of the plurality of programs.

In accordance with another aspect, the present application describes a method that includes displaying an electronic program grid on a display of a touchscreen device, the electronic program grid including a plurality of television-show interface elements, each television-show interface element being associated with a television show being broadcast on a distribution network, each interface element being associated with at least two input commands; receiving an input command through one of the television-show interface elements on the touchscreen; determining whether the input command is of a first input command type and, if so, sending a command to a set-top box associated with a television to tune the television show associated with said one of the television-show interface elements; and determining whether the input command is of a second input command type and, if so, displaying related content on the touchscreen device, wherein the related content is associated with said one of the television-show interface elements.

In accordance with a further aspect, the present application describes a method of controlling a video receiver using a handheld device, the handheld device having a display screen. The method includes displaying on the display screen an electronic program guide including a plurality of tiles, each tile associated with a program; receiving an input command in association with one of the plurality of tiles; and determining that the input command is a channel change request and, in response, sending a channel change request message to a gateway server over a wireless network connection, whereby the gateway server is configured to send a channel change command to the video receiver over a private broadcast digital television network in response to the channel change request message.

In accordance with yet a further aspect, the present application describes a mobile device comprising a touchscreen, a processor, memory, a communications subsystem, and a remote control application executable by the processor. The remote control application, when executed, configures the processor to display an electronic program guide including a plurality of tiles, each tile associated with a program; receive an input command in association with one of the plurality of tiles; determine that the input command is a related content request and, in response, send a related content request message to a gateway server over a wireless network connection, the related content request message including information identifying said one of the plurality of programs; and receive and display related media content from the gateway server in reply to the related content request message, wherein the related media content is associated with said one of the plurality of programs.

In accordance with another aspect, the present application describes a mobile device comprising a touchscreen, a processor, memory, a communications subsystem, and a remote control application executable by the processor. The remote control application, when executed, configures the processor to display an electronic program grid on a display of a touchscreen device, the electronic program grid including a plurality of television-show interface elements, each television-show interface element being associated with a television show being broadcast on a distribution network, each interface element being associated with at least two input commands; receive an input command through one of the television-show interface elements on the touchscreen; determine whether the input command is of a first input command type and, if so, send a command to a set-top box associated with a television to tune the television show associated with said one of the television-show interface elements; and determine whether the input command is of a second input command type and, if so, display related content on the touchscreen device, wherein the related content is associated with said one of the television-show interface elements.

Reference is now made to FIG. 1, which diagrammatically shows a system 10 for controlling video programming. The system 10 includes a video receiver 12 connected to an operator network 14. The video receiver 12 may include a set-top box, a personal video recorder (PVR), or other such device. The video receiver 12 receives video signals from the operator network 14. The signals may include broadcast signals, which may include a plurality of frequency multiplexed channels. In some cases, the broadcast signals may include two or more channels time multiplexed. The operator network 14 may include, for example, a cable television network (CATV), a satellite television network such as direct broadcast satellite (DBS) systems, or a telephone network using digital subscriber line (DSL) technology. The operator network 14 may be configured to provide the broadcast signals over IPTV. In many embodiments, the IPTV service may be configured to provide multicast programming, such as pay-per-view (PPV), and video-on-demand (VOD) programming. In some embodiments, the operator network 14 provides both broadcast programming in the form of multiplexed broadcast channels and multicast and/or VOD programming.

The video receiver 12 includes a tuner 18, which may be broadly understood to include both conventional tuning devices for selecting a channel in a frequency multiplexed broadcast environment and an IP interface for subscribing to a multicast stream or requesting and receiving a VOD program. The tuner 18 outputs video for a selected channel or program to a display device 20. The display device may include a television, a video monitor, a computer, or other visual display device. In some instances, the display device 20 and video receiver 12 are an integrated unit. In some cases, the video receiver 12 is integrated with other video system, such as a video disc player (e.g. DVD, Blu-ray, etc.).

The video receiver 12 may be controlled using a remote control 22. The remote control 22 includes a number of buttons or other input devices that a user may activate to send commands to the video receiver 12. The remote control 22 typically transmits commands using infrared signals. The video receiver 12 includes an infrared sensor 24 for receiving infrared signals from the remote control 22.

The video receiver 12 has assigned a public or private IP address 26. One or more operator servers 16 may send and receive messages with the video receiver 12 over the operator network 14. The operator server 16 may be configured to provide the video receiver 12 with VOD programs, an electronic program guide (EPG), program metadata, and other such information. In some instances, the operator server 16 may be configured to receive request messages from the video receiver 12 for a VOD or PPV program, login or passcode information, and to process billing associated with the VOD or PPV program.

In some situations, the video receiver 12 may be equipped with a short range communication subsystem 28, such as Bluetooth™ or WiFi (IEEE 802.11) functionality, to enable short range communications with other computing devices.

Referring still to FIG. 1, in accordance with one aspect of the present application the system 10 includes a mobile device 50. The mobile device 50 may, in some embodiments, include a handheld mobile smartphone, a laptop, a netbook, or a tablet. In the example embodiments described below, the mobile device 50 may be referred to and described as a tablet device, however the present application is not limited to tablet devices and may include any mobile device configured to have the functionality described herein.

The mobile device 50 includes a wireless communication subsystem 52 for sending and receiving communications with a wireless network 32. The wireless network 32 may include wireless wide area networks (WWAN), including GSM, GPRS, EDGE/3GPP, UMTS, EvDO CDMA 2000, HSDPA, LTE (E-UTRA), WiMAX (802.16m), Mobile WiMAX (802.16e), or any other such mobile network protocol. The wireless network 32 may include wireless local area networks (WLAN), such as those conforming to one or more of the IEEE 802.11x standards (sometimes referred to as WiFi). Other wireless network protocols may also be used by the wireless network 32.

The wireless network 32 connects to a public network 30, such as the Internet.

A gateway server 60 is connected to both the public network 30 and the operator network 14. The gateway server 60 is configured to communicate with the video receiver 12 via the operator network 14 and with the mobile device 50 via the public network 30 and wireless network 32. In some instances, the wireless network 32 may include an access point connected via cable modem or DSL to the operator network 14 and through a relay therein to the public network 30; however, for ease of illustration, the wireless network 32 is illustrated as being separate from the operator network 14 in this embodiment. As will be described in greater detail below, the gateway server 60 stores an association or pairing between the mobile device 50 and the video receiver 12.

The mobile device 50 includes a remote control application 54. The remote control application 54 provides a graphical user interface (GUI) on the mobile device 50 through which the video receiver 12 may be controlled. In addition, the GUI provides additional feature-rich content associated with the programs available at the video receiver 12. For example, the GUI may provide an interactive program guide (IPG) through which available programming may be browsed, selected, and searched. In some embodiments, the GUI may adapt the layout and content of the IPG to viewer preferences, usage patterns, content popularity, etc. The GUI enables channel change through selection of an icon, tile or other graphical element associated with a program or channel. In response, the mobile device 50 is configured to send a channel change request message to the gateway server 60 which then relays the channel change request message to the paired video receiver 12. The remote control application 54 further enables integration of content from multiple providers; for example, it may enable related content search and display. In the latter example, a request for related content associated with one of programs may be received through the GUI. The mobile device 50 sends a related content message to the gateway server 60, which then formats and sends a request to one or more content servers in the public network 30. The content servers respond with search results, which the gateway server 60 then relays to the mobile device 50. It will be appreciated that the gateway server 60 may act as a proxy server for the mobile device 50 in receiving and sending related content requests.

Figure 2:
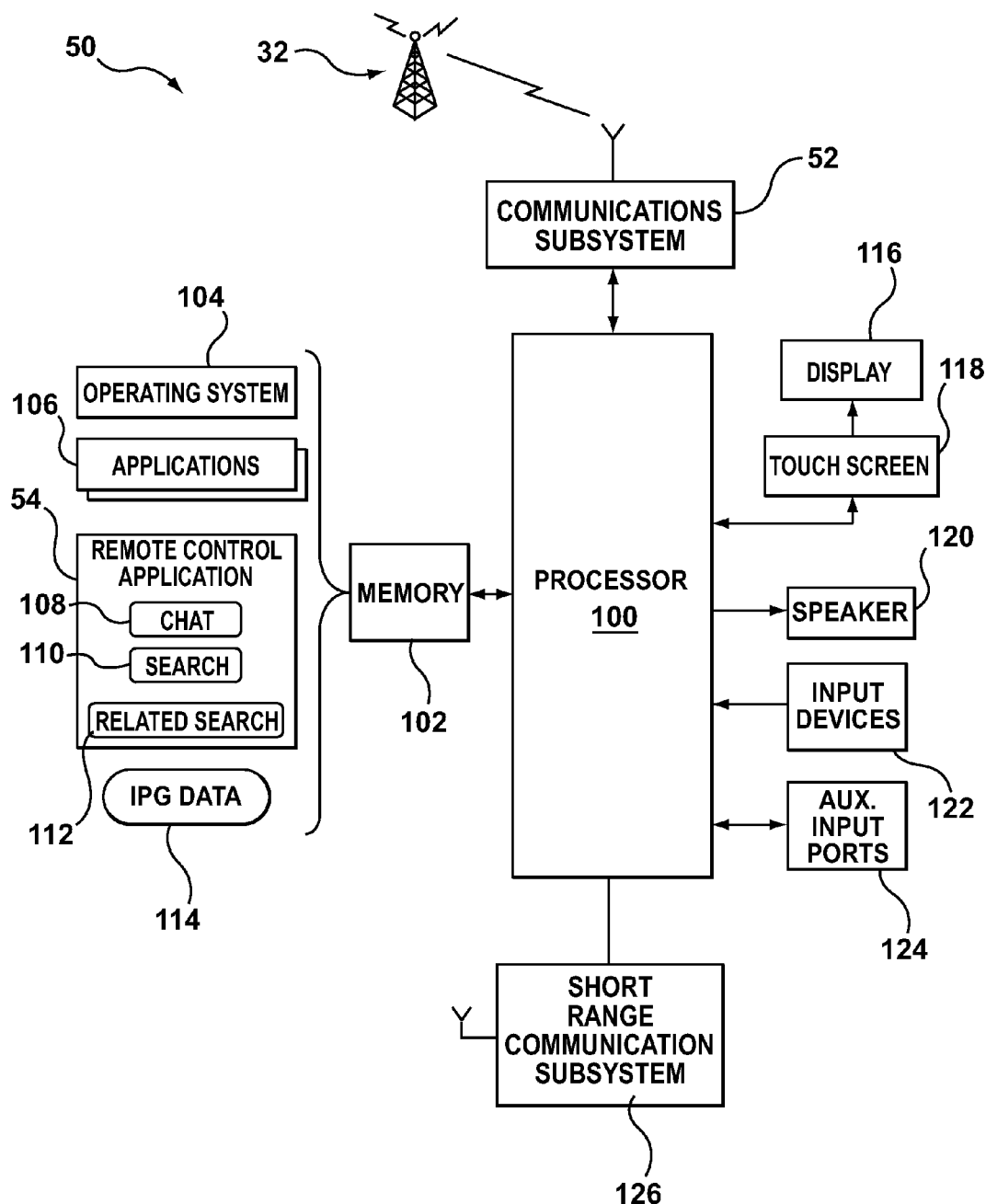
FIG. 2 is a block diagram showing an example of a mobile device.

Reference is now made to FIG. 2, which shows, in block diagram form, an example embodiment of the mobile device 50. The mobile device 50 includes at least one processor 100 (such as a microprocessor) which controls the overall operation of the mobile device 50 and the execution of computer-readable instructions. The processor 100 interacts with device subsystems such as a the wireless communication subsystem 52 for exchanging radio frequency signals with the wireless network 32 to perform communication functions. The processor 100 interacts with additional device subsystems including a display 116 such as a liquid crystal display (LCD) screen, and memory 102. The display 116 may be a touch-screen display with a touch sensitive input surface 118.

The mobile device 50 may, in some embodiments, also include a speaker 120, one or more input devices 122 including buttons, hotkeys, a trackball, a trackpad, a keyboard or other such input devices. In some embodiments, the mobile device 50 may include one or more accelerometers, gyroscopes or other gravitational or inertial sensors through which the processor 100 may be configured to receive movement-based inputs, such as gesture-based commands. In some cases, the mobile device 50 may include auxiliary input ports 124, such as HDMI ports, USB ports, or other data communication ports.

The mobile device 50 may include one or more short range communication subsystems 126, such as a Bluetooth™ module, an infrared transmitter and/or sensor, etc.

The processor 100 operates under stored program control and executes computer-readable instructions stored in memory 102. The memory 102 may store operating system software 104 and software applications 106, which may include, for example, a web browser and a messaging application.

The memory 102 stores the remote control application 54. In some embodiments the remote control application 54 may include a chat component 108, a search component 110, and a related content search component 112. Although, for ease of illustration, these are described as components they may be integrated within the remote control application 54 and may not be readily identifiable as separate components of the remote control application 54 in some embodiments. The components may also be standalone components or part of another application, in some embodiments. For example, the chat component 108 may be implemented as a standalone or separate component or module and may be integrated within the GUI of the remote control application 54 using suitable APIs.

The memory 102 further stores IPG data 114. The IPG data 114 may be updated, refreshed and replaced from time to time based upon the current time and the timespan of IPG data the remote control application 54 is configured to maintain available. In one embodiment, the IPG data 114 is obtained by the mobile device 50 from the gateway server 60, which in turn obtains IPG data from the operator server 16. The gateway server 60 may maintain full IPG data and may send the mobile device 50 a subset of the data, such as three hours of IPG data from the current time onwards. The subset may include a subset of channels based upon a current channel to which the video receiver 12 is tuned. As a user browses or searches the IPG through the GUI, further requests for IPG data are sent from the mobile device 50 to the gateway server 60, and the gateway server 60 provides the additional IPG data 114 for scrolling, panning or otherwise navigating the IPG on screen.

Figure 3:
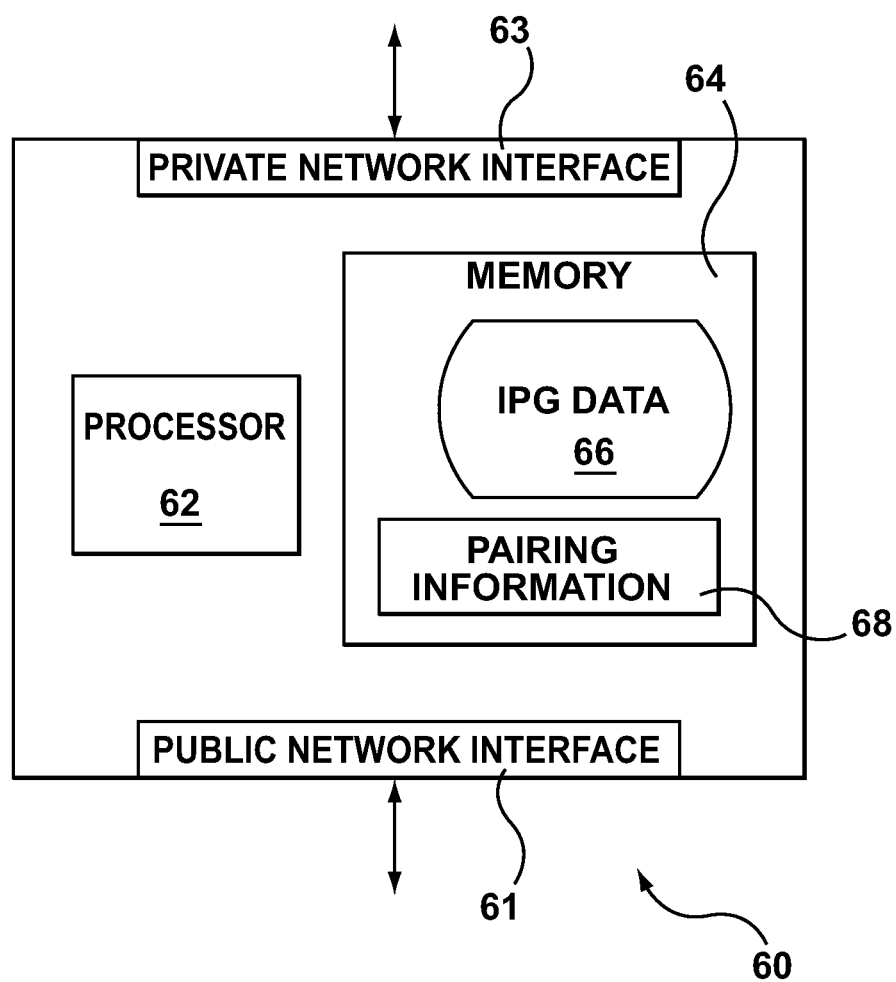
FIG. 3 is a block diagram showing an example of a gateway server.

Reference is now made to FIG. 3, which shows, in simplified block diagram, an example embodiment of the gateway server 60. The gateway server 60 may include one or more processors 62 and memory 64. The memory 64 stores IPG data for responding to requests from mobile devices for additional IPG data. The gateway server 60 further includes a private network interface 63 for exchanging communications with the operator network 14 (FIG. 1), and a public network interface 61 for exchanging communications with the public network 30 (FIG. 1).

The memory 64 in the gateway server 60 further includes pairing information 68. The pairing information 68 associates a mobile device with a video receiver. In this manner, messages received from the mobile device, such as a channel change request, may be routed appropriately to the associated video receiver through the operator network. The association may include an identifier for the mobile device and an identifier for the video receiver. For example, the association may include the public IP address of the mobile device and the private IP address of the video receiver. The association may also or alternatively include other higher layer unique address information for the mobile device and the video receiver, such as a SIP URI or other identifier.

Figure 4:
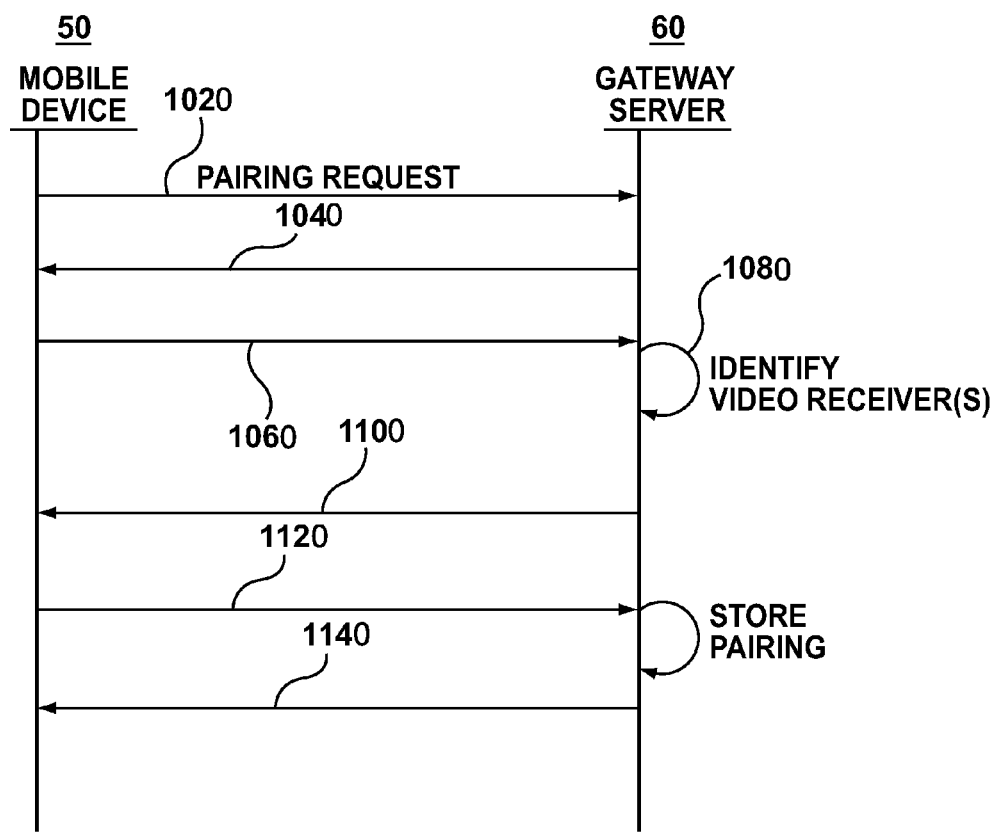
FIG. 4 is an example signalling diagram for pairing a mobile device and a video receiver.

FIG. 4 shows an example signalling diagram for establishing an association between a mobile device 50 and a video receiver 12 (FIG. 1). In this embodiment, the mobile device 50 initiates creation of the association. This may occur, for example, when a mobile device user decides that he or she would like to control a video receiver, such as a set top box, using his or her mobile device. Using the remote control application 54 (FIG. 2), the user requests that the mobile device 50 be paired with the video receiver. As shown in the signalling diagram, the mobile device 50 sends a pairing request message 1020 to the gateway server 60. The pairing request message 1020, and all other messages in the signalling diagram, may be formatted in accordance with any protocol used for communications between the mobile device 50 and the gateway server 60. For example, in one embodiment Java Script Object Notation (JSON) may be used for messaging communications. In other embodiments, other protocols may be used.

The pairing request message 1020 includes at least an identifier for the mobile device 50. The identifier may include a mobile device address, such as an IP address, a phone number, a SIM number, a SIP URI, or other unique identifier. More than one identifier may be present in the pairing request message 1020.

In some cases, the pairing request message 1020 may include information identifying the video receiver to which the mobile device 50 wished to be associated. The information identifying the video receiver may include an IP address or serial no. In some cases, the information identifying the video receiver may only be associated with the receiver, such as a telephone number associated with the premises, network operator billing account number, or other such identifier.

In some embodiments, the gateway server 60 may send a prompt message 1040 soliciting identification or login information, so as to authenticate the mobile device 50. The mobile device 50 may respond with login or identifying information 1060 which the gateway server 60 may then authenticate. For example, the video receiver or a billing account associated with the video receiver may have a password, passcode, or other authentication data stored at or accessible to the gateway server 60. In short, through this authentication the gateway server 60 may ensure that the mobile device 50 user is authorized to control the video receiver by confirming that the user can provide the authentication data associated with the video receiver. Otherwise, third parties could assume control over another person's video receiver without authorization.

In some embodiments, the identification and login information provided in message 1060 may be provided in the pairing request message 1020, or later in the signalling sequence, such as after selection of a particular video receiver, as will be described below.

In some embodiments, the gateway server 60 may not require login or identifying information in circumstances where there is an apparent authorization. For example, if the mobile device 50 provides the video receiver IP address, serial number, or international mobile equipment identity (IMEI) in the pairing request message 1020, that may indicate a sufficient relationship and authority to pair the mobile device 50 to the receiver.

Referring still to FIG. 4, having received the pairing request message 1020 and identification or login information (if any) then the gateway server 60 identifies the video receiver(s) to which the mobile device may be paired in operation 1080. In some instance, a single video receiver may be identified. For example if the pairing request message 1020 includes an IP address or receiver serial no., then a unique video receiver may be identified. Similarly, if the pairing request message 1020 provides a phone number or billing account number with which a single video receiver is associated, then the gateway server 60 identifies that single video receiver. In other situations, more than one video receiver may be identified. For example, a phone number or billing account number may be associated with premises that have two or more video receivers. Accordingly, the gateway server 60 identifies all such video receivers that may be paired to the mobile device 50.

In message 1100, the gateway server 60 may send the mobile device 50 the identities of the one or more video receivers identified. The mobile device 50 may be configured to present, graphically or otherwise, the video receivers and to receive a selection of one of the receivers. The GUI on the mobile device 50 may request confirmation of the intention to pair the mobile device 50 to the selected video receiver. In some embodiments, message 1100 may include model, make, or type of receiver, and the GUI may display icons corresponding to the model, make or type of receiver. In some cases, individual receivers may be named or otherwise identified, such as "Family Room Set Top Box". Names may have been assigned to the receivers upon installation and configuration, for example using the remote control and a receiver interface screen. In message 1120, the mobile device 50 sends the identity of the selected video receiver to the gateway server 60. The gateway server 60 then stores the association between the selected video receiver and the mobile device 50, and sends a confirmation message 1140 to the mobile device 50.

After creation of the association the mobile device 50 and, in particular, the remote control application 54, is capable of controlling the selected video receiver by sending command messages to the gateway server 60, which then relays those commands to the video receiver based upon the stored association.

It will be appreciated that aspects of the pairing process may be varied from the example described above without materially affecting the creation of an association at the gateway server 60 between the mobile device 50 and a selected video receiver.

Figure 5:
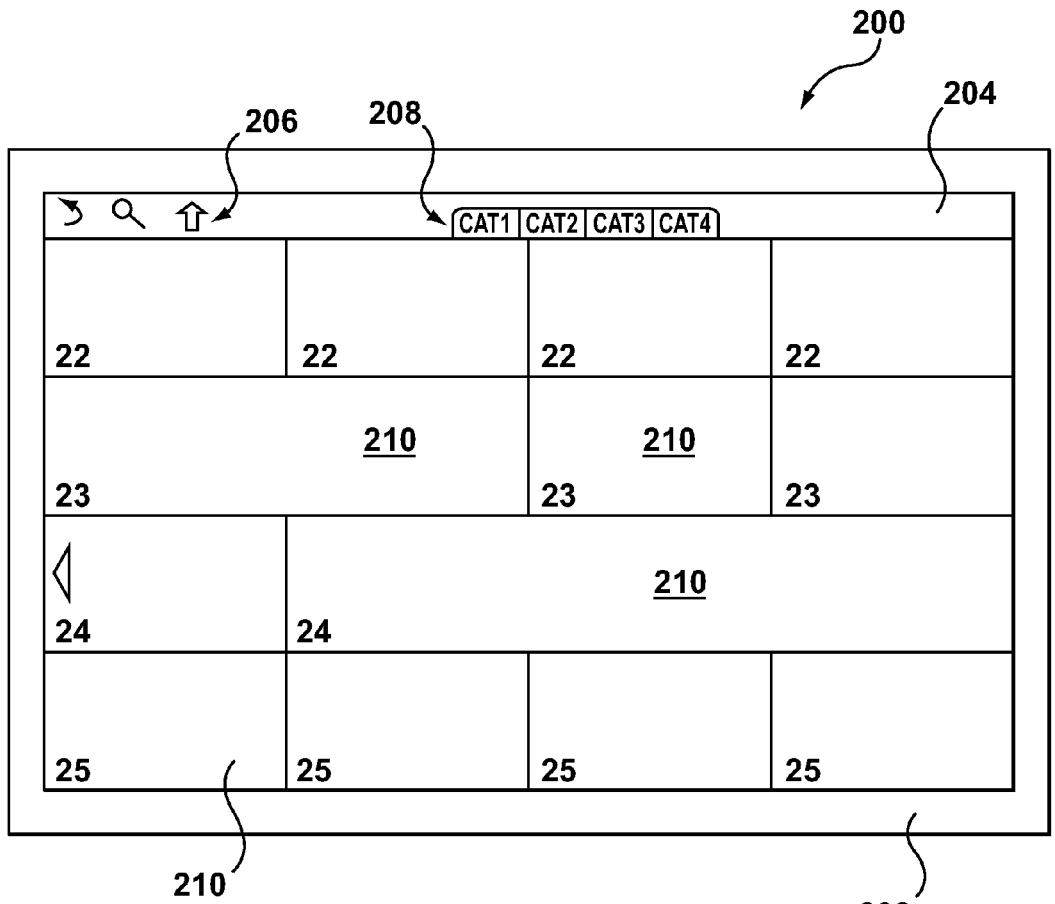
FIG. 5 graphically shows an example embodiment of a graphical user interface for remote control of a video receiver via a mobile device.
Figure 6:
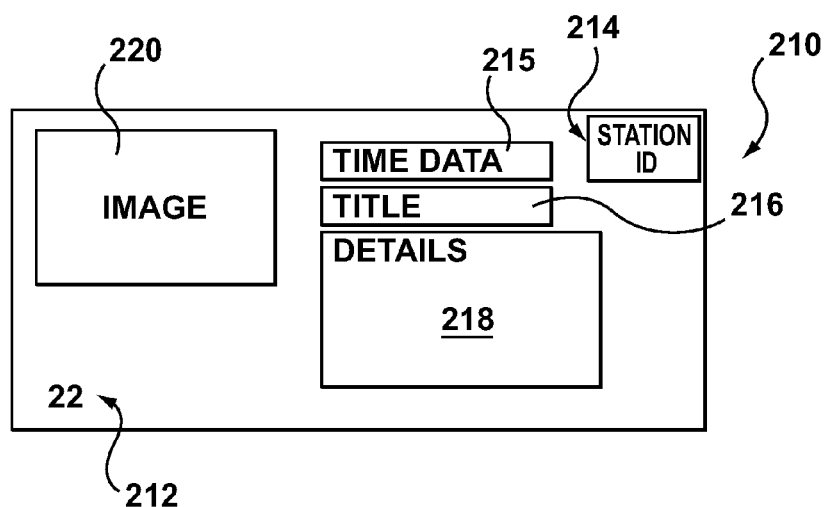
FIG. 6 shows a detailed portion of the graphical user interface of FIG. 5.

Reference is now made to FIGS. 5 and 6, which show aspects of an example GUI 200 for the remote control application 54 (FIG. 1). In this example illustration, the mobile device 50 is presumed to be a touchscreen tablet device, however the present application is not necessarily limited to touchscreen devices in particular, or to tablet devices. FIG. 5 illustrates the GUI 200 on the display screen of a tablet device 202.

The GUI 200 includes a header bar 204 in this example. The header bar 204 provides navigational icons 206 and, in this example, category tabs 208. The remainder of the GUI 200 displays IPG program information in a tile format. Each individual tile 210 indicates a program on a particular channel. The location and length of each tile 210 may represent the start time and duration of the program in some embodiments. In the present embodiment, the GUI 200 may be navigated using touchscreen movements such as swipes to left or right, up or down, to scroll through the channels and time slots of the IPG. The category tabs 208 in the header bar 204 may be selected to cause display of a subset of the channels or programs based upon the category. For example, one of the categories may be for "sports", in which case selection of that category tab 208 would result in display of only the programs and channels that relate to sports content. The GUI may also include an overlay sidebar (not shown) for displaying shortcuts for particular channels or operations.

In some embodiments, other gestures or movements on the touchscreen may cause other operations. For example, tapping or otherwise selecting one of the tiles may initiate transmission of a channel change message from the mobile device 50 to the video receiver 12. In some cases, pinching or spreading movements may cause zoom operations to occur. In some example embodiments, pinching or spreading or other such touchscreen gesture movements in connection with a tile may initiate live streaming of the program to the mobile device 50.

FIG. 6 graphically illustrates an example tile 210. The example tile 210 includes a channel number 212 and station identifier 214. The tile 210 further includes the title 216 of the program and time data 215 related to the program. The time data 215 may include a start time, duration, and other such data. Details 218 regarding the program, such as actors, plot synopsis, overview information, episode details, etc., may also be provided on the tile 210.

The tile 210 may also include a graphic image 220. The graphic image 220 is related to the program and may include a logo or photo related to the program. In some instances the graphic image 220 may include an animation, such as an animated GIF or other such video, related to the program. In one embodiment, the graphic image 220 may appear as a still image (i.e. PNG, GIF, JPEG, BMP, or other image format) in all the tiles 210, but may be selectable in the GUI 200. When the graphic image 220 is selected, the mobile device 50 may be configured to display a short preview video or animated clip in place of the graphic image 220. In some instances, the preview video or animated clip may be shown in a window or display tiled on top of the GUI 200. In some cases, the preview video or animated clip may be a small video shown within the graphic image 220 area in the tile 210. Selection of the graphic image 220 to initiate display of the video or clip may include the mobile device 50 sending a video request message to the gateway server 60 and receiving the video data in response, whether streamed or downloaded.

The GUI 200 operates as an IPG and a remote control for the video receiver with which the mobile device is associated. Accordingly, selection of one of the tiles 210 on the GUI 200 causes the remote control application 54 to generate a channel change request message to the gateway server 60, which relays the message to the video receiver, which then tunes the requested channel. In one example embodiment, the GUI 200 is configured to operate as a "one-click" remote control, meaning that a single tap on one of the tiles 210 causes a channel change to that program or channel. In some embodiments, the GUI 200 may be configured to recognize another type of selection of one of tiles, through a different touchscreen movement, like a double-tap versus a single-tap, or other gestures, that results in a request for related content. Requests for related content are described in greater detail below.

In one embodiment, the GUI 200 may be configured to modify the display based upon information from the gateway server 60 regarding viewership statistics. For example, the gateway server 60 may provide the mobile device 50 with data regarding current viewership for channels. The GUI may indicate the relative popularity of currently live channels some manner. For example, in one embodiment the GUI 200 may display the channels in order of increasing or decreasing popularity. In one example the GUI 200 may offer a button or other input which, when selected, displays a list of the current most popular channels. In another example, the GUI 200 may be configured to only highlight channels that have above a present threshold of viewership as a way of highlighting live currently popular programs or events. In yet another example, the colours of the tiles associated with the programs may be modified based upon their relative popularity. For example, the top five programs with the most current viewers may be highlighted or displayed in different colours so as to draw attention to them. In yet a further example, viewership statistics may be displayed on the tiles for current live programs. The viewership statistics may include a total number of viewers on the operator network 14, or a percentage share, or a relative ranking based upon total number of viewers. In another example, the GUI 200 may distinguish between standard definition, high definition and 3D channels, such as through use of different colours, fonts, backgrounds, or symbols. Yet other example implementations are also contemplated.

In another embodiment, the GUI 200 and gateway server 60 may provide chat functionality in connection with current live programs. For example, the GUI 200 may permit launch of an embedded or stand alone chat application on the mobile device 50. The chat application may be part of the remote control application 54 in some implementations. The chat application may connect to the gateway server 60 to establish a chat session. The chat session may be associated with a program selected on the mobile device 50. In this manner, the user of the mobile device 50 is provided with access to live chat regarding a program currently being viewed on the video receiver 12.

Figure 7:
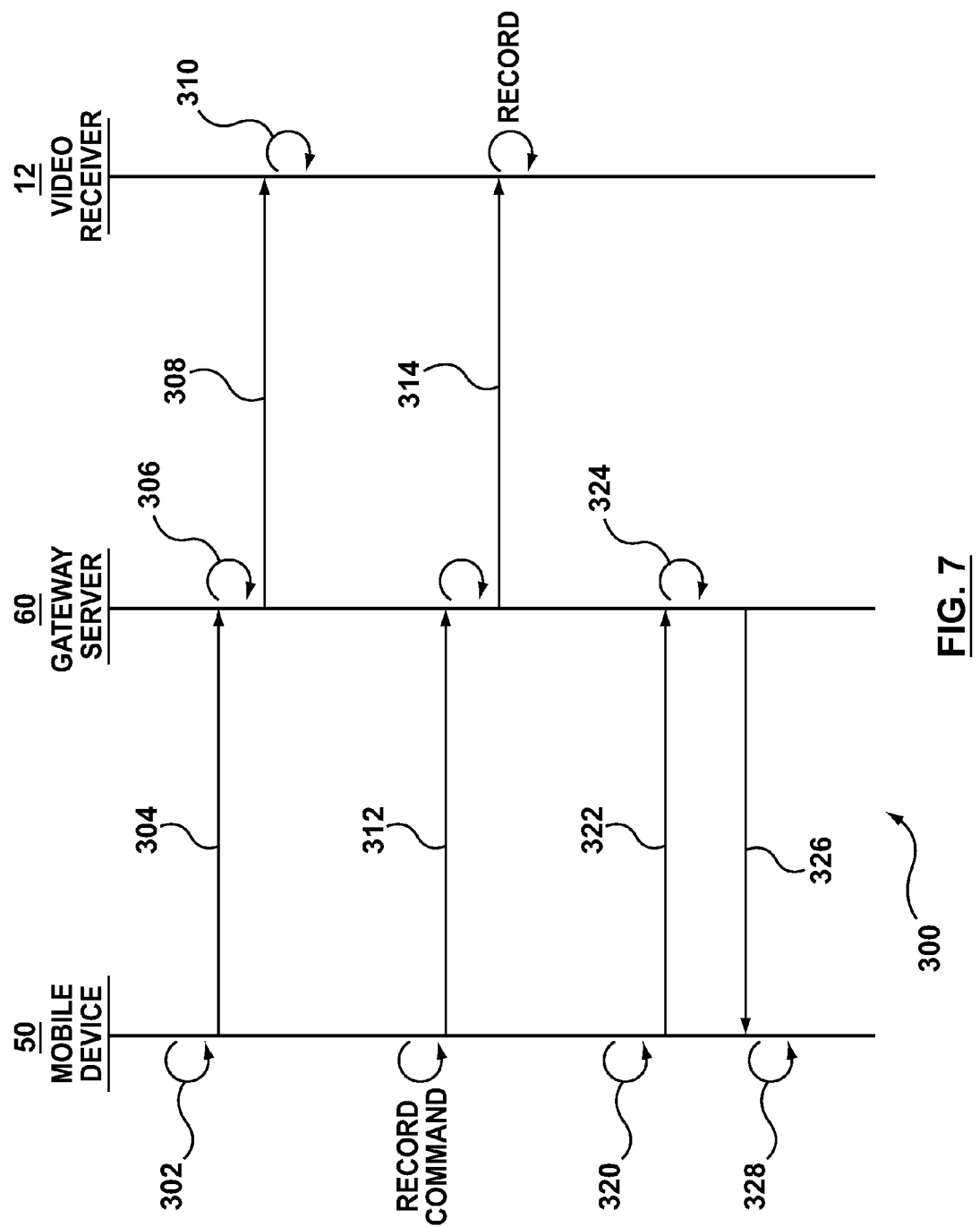
FIG. 7 shows an example signalling diagram for controlling a video receiver using a mobile device.

Reference is now made to FIG. 7, which shows an example signalling diagram 300 for changing channels and searching programs. The mobile device 50 receives selection of a program via the GUI. For example, in one embodiment the use may single tap the tile corresponding to the desired program. If the program is currently available, i.e. it is a live broadcast on that channel, then the mobile device 50 may initiate a channel change request. In some instances, the program may not be live: it may be scheduled for broadcast at some time in the future or it may be a video-on-demand offering. In these circumstances, the mobile device 50 may prompt for additional input, such as whether the user wishes to switch to that channel now despite the fact that the program is not currently available, or whether the user wishes to configure the video receiver 12 to record that program when it airs, or whether the user wishes to order that VOD offering if it is available in that format.

A channel change request message 304 is sent from the mobile device 50 to the gateway server 60. The channel change request message 304 includes an identifier for the program or the channel or both. The gateway server 60 receives the channel change request message 304 and, at 306, identifies the video receiver associated with the mobile device 50. In other words, based on the identity of the mobile device 50 that sent the channel change request message 304, the gateway server 60 locates the stored association that pairs the mobile device 50 to a particular video receiver 12. Once the associated video receiver 12 has been identified the gateway server 60 sends a relay request message 308 to the video receiver 12 via the operator network 14 (FIG. 1). The relay request message 308 passes the channel change request; that is, the relay request message 308 identifies the requested channel or program or both and includes a command or instruction that the video receiver 12 is configured to interpret as a channel change instruction. The relay request message 308 may, in some instances, be in a proprietary format.

In one example embodiment, communications from the gateway server 16 to the video receiver 12 may include UDP messages addressed to a particular port on the video receiver 12. The UDP message may include command instructions that the video receiver 12 is configured to recognize and interpret appropriately. In particular, the video receiver 12 may include an agent or other software module configured to receive command instructions and to cause associated hardware in the video receiver 12 to implement the command. In one example, the agent may be a "SARA Resident Application", which is proprietary to Cisco Systems, Inc. of San Jose, Calif. In other example implementations other agents may be used. The agent may, in some cases, be developed using the OCAP platform using the OCAP API remote control operations. Communications between the gateway server 16 and video receiver 12 may be implemented using XML, SOAP, RPC, REST, JSON, or any other such communications protocol.

The video receiver 12, on receiving the relay request message 308, tunes the requested channel 310.

Also shown in FIG. 7 is a signalling sequence for the circumstance in which the user selects recordal of a program. This may include a live program or a scheduled future program. Through the GUI, the mobile device 50 receives an instruction or command to record a selected program. This may include an instruction to establish multiple recordings, such as regularly scheduled recordings of a time slot, program, etc. The mobile device 50 generates and sends a record request message 312 to the gateway server 60. The record request message 312 includes details of the program, channel or schedule for the recordings.

As described above, the gateway server 60 identifies the video receiver 12 associated with the mobile device 50 and relays the recordal request in a relay record request message 314 addressed to the video receiver. The video receiver 12, on receiving the relay record request message 314 is configured to implement the record instruction by recording a channel or scheduling the future recording of a channel.

FIG. 7 further illustrates a signalling sequence relating to a search within the IPG. Through the GUI, the mobile device 50 may receive a search command 320. The search command 320 may include a search term or phrase input by a user through the GUI, for example through a search input field. The search command 320 may be one of a number of preconfigured selectable searches for related programs or programs from the same genre or with one or more of the same actors, director, or other commonalities.

The mobile device 50 generates and sends a search request message 322 to the gateway server 60. The gateway server 60 performs the search 324 of the IPG based on the search parameters in the search request message 322. In some implementations, the gateway server 60 may instruct the operator server 16 to perform the search and may receive results from the operator server 16. In any case, the gateway server 60 obtains search results. The search results include programs or channels that meet the search parameters. The search results are packaged and provided to the mobile device 50 in a search results message 326. In some implementations, the search results message 326 may include a list of programs or associated identifiers. The list may be ordered, perhaps for a measure of relevance to the search query. The search results message 326 may further include, either together with the list or separately, even in a separate message, IPG data that the mobile device 50 may require to display the search results. The IPG data that the device 50 may want might include logos or images, details, and time sltos for the programs, to the extent that they have not already been provided to the mobile device 50 in the IPG data 114 (FIG. 2) stored on the mobile device 50. Other IPG related data for displaying the search results may also be included.

The mobile device 50 displays the search results 328 on the display. The display of the search results may include providing a ranked list of programs, where each program is represented by a tile such as the tile 210 (FIG. 6). The display may include display of the GUI 200 (FIG. 5) with the programs identified in the search results highlighted or marked in some manner. For example, the tiles of those programs identified in the search results may be rendered in a different background color than the other tiles. Other mechanisms for displaying the search results are also contemplated herein.

Reference is again made to FIG. 1. The public network 30 may include one or more content providers 70. Content providers 70 include sites that offer multimedia content, such as music, video, games, news, or other content. Examples include Youtube™, Rogers On-Demand Online™ (RODO™) Hulu™, Netflix™, Metacafe™, Cineplex™, etc. Some content providers, like Youtube™, aggregate content from a number of sources and may include content that is related to programming available through the video receiver 12. Accordingly, the remote control application 54 is configured to enable related content retrieval to the mobile device 50 via the GUI 200 (FIG. 6).

Figure 8:
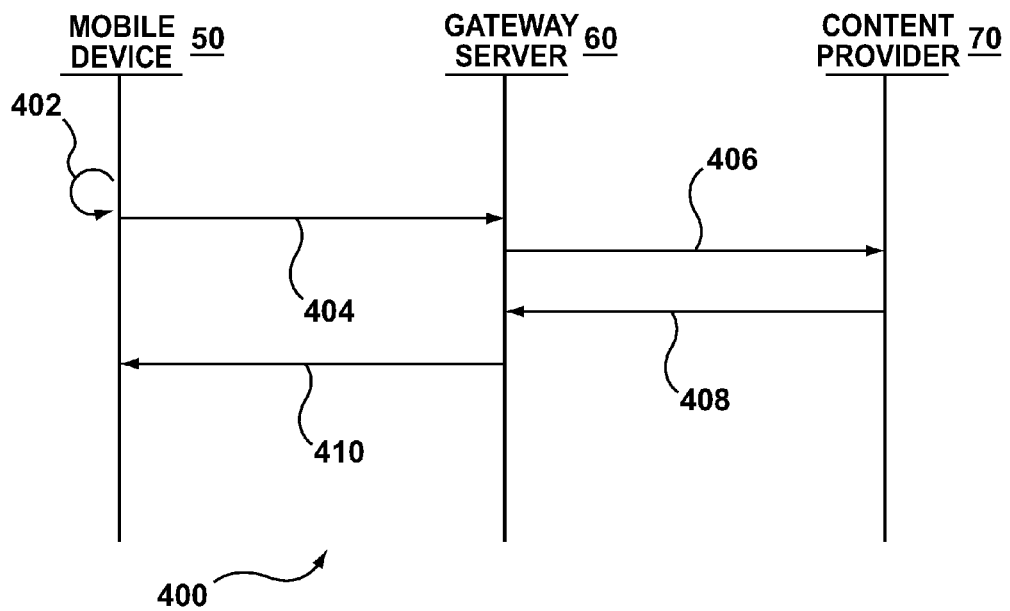
FIG. 8 shows an example signalling diagram for retrieving related content.

Reference is now made to FIG. 8, which shows a signalling diagram 400 for retrieving related content. Through the GUI 200 (FIG. 6) the mobile device 50 receives a related content request 402. The related content request 402 is made in association with one of the programs displayed in the GUI 200. For example, the related content request 402 may be detected by the mobile device 50 on the basis of receiving a predefined touchscreen gesture in association with the tile for a particular program. In one embodiment, the gesture may be a double tap on the tile associated with a program. In another embodiment, the gesture may be a swipe, pinch, or other gesture. The GUI 200 may be configured to interpret other gestures, touches, or inputs as requests for related content.

The mobile device 50 generates and sends a related content request message 404 to the gateway server 60. The related content request message 404 identifies the program with which the request is associated. For example, it may include the title of the program, a program identification number, a channel number, or other such identifiers.

The gateway server 60 then sends a search query 406 to the content provider 70. The search query 406 may include one or more terms or phrases associated with the program identifies in the related content request message 404. These search terms and phrases may be preconfigured in the gateway server 60 in association with particular programs. The search terms may include the title of the program, the names of one or more actors, the genre of the program, an episode number or identifier, or other such data. In some cases, the gateway server 60 may receive and include additional search terms or parameters from the mobile device 50. Historical data may be used to identify more relevant content by utilizing usage statistics for a particular event or program. In many embodiments, the content provider 70 may provide an API or other interface through which it can receive search queries.

The content provider 70 returns a search results message 408. In some cases, the gateway server 60 may parse the search results message 408 to extract search results and provide them to the mobile device 50. In other embodiments, the gateway server 60 may forward the search results message 408 without modification to the mobile device 50. In any event, a relayed search results message 410 is sent from the gateway server 60 to the mobile device 50. The mobile device 50 then displays the search results and, in some instance, the related content identified in the search results.

In one example embodiment the mobile device 50 and remote control application 54 may be configured to perform related content searching directly using content providers' APIs, bypassing the gateway 60.

The GUI 200 is configured to display content received in the search results or as a results of selection of one of the search results. For example, the GUI 200 may be configured to display related Youtube™ videos associated with a selected program. In another example, the GUI 200 may be configured to display iTunes™ music available for purchase and download that is associated with the program, perhaps due to its use in the soundtrack. In yet another example, the GUI 200 may be configured to launch a chat interface hosted on by the content provider 70, where the chat relates to the selected program. In yet a further example, the GUI 200 may be configured to provide the latest Twitter™ feeds, blog entries, or news items relating to the program.

It will be appreciated that in many implementations the gateway server 60 is acting as a proxy server for related content searching on behalf of the mobile device 50. In some respects, the gateway server 60 may perform enhanced proxy services, in that the gateway server 60 may be configured to generate the search query message 406 based on the identity of the program selected for related content searching. In some implementations, depending on the nature of the content provider 70 and the related content, the gateway server 60 may perform other proxy services, such as establishing a session between the mobile device 50 and the content provider 70. SIP signalling or similar such protocols may be used by the gateway server 60 to set-up, monitor, and tear-down such real-time related content sessions.

Although the term "message" is used herein when describing signalling between elements, it should be understood that message may include a wide variety of signals and protocols and is not intended to be limiting.

Figure 9:
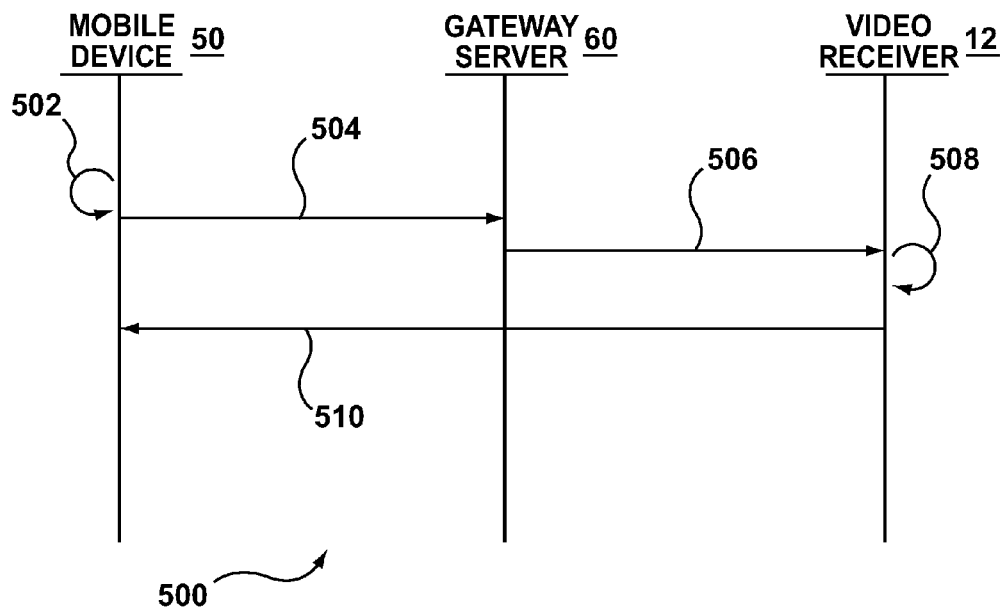
FIG. 9 shows an example signalling diagram for streaming video to a mobile device.

Reference is now made to FIG. 9, which shows an example signalling diagram 500 for viewing a program on the mobile device 50. In this example, the mobile device 50 and video receiver 12 are configured to permit viewing of program content on the mobile device 50. In this particular example, the video receiver 12 and mobile device 50 are both equipped with short range wireless communication capabilities, such as Bluetooth™, WiFi, etc., such that the video receiver 12 is capable of streaming program content to the mobile device 12. In another example, the mobile device 50 may receive the program content from the gateway server 50 via the wireless network 32.

In this example, the mobile device 50 receives an on-device program selection 502 identifying the selected program. This selection may be received via the GUI 200 (FIG. 6). The mobile device 50 sends the on-device program request 504 to the gateway server 60, which then relays the request as a relayed on-device program request 506 to the associated video receiver 12. The video receiver 12 may tune the selected channel 508, and then streams the channel to the mobile device 50. It will be appreciated that the video receiver 12 may be configured to send or stream the selected channel in its undecoded compressed format, provided the mobile device 50 is configured with a suitable decoder for viewing the program. The streamed program may be transmitted over a short range link from the video receiver 12 to the mobile device 50. In some embodiments, the video receiver 12 is equipped with the capability of tuning more than one channel, thereby enabling display of one program on its display device 20 and a different program on the mobile device 50.

The above-described embodiments of the present disclosure are intended to be examples only. Alterations, modifications and variations may be effected to the particular embodiments by those skilled in the art having the benefit of the present disclosure without departing from the scope of the disclosure, which is defined by the claims appended hereto.

The invention claimed is:

1. A method of obtaining related content, the method comprising:
   displaying an electronic program guide including a plurality of tiles, each tile associated with a program, each of the plurality of tiles being associated with two input commands including a first input command for initiating display of the program at a first device and a second input command comprising a related content request for initiating display at a second device;
   receiving an input command in association with one of the plurality of tiles;
   determining that the received input command is a related content request and, in response, sending a related content search query to a gateway server over a wireless network connection, the related content search query including information identifying said one of the plurality of programs;
   receiving related media content search results from the gateway server in reply to the related content search query, wherein the related media content search results is associated with said one of the plurality of programs; and
   in response to receiving related media content search results, displaying related media content identified in the related media content search results at the second device, the related media content comprising a video associated with said one of the plurality of programs.

2. The method claimed in claim 1, wherein the related media content comprises video content.

3. The method claimed in claim 1, wherein the input command comprises a predefined touchscreen gesture atop the tile associated with said one of the plurality of programs.

4. The method claimed in claim 3, wherein the predefined touchscreen gesture comprises a double tap, a swipe or a pinch.

5. The method claimed in claim 1, wherein the method further comprises sending a content request from the gateway server to a content server associated with the related media content search results, and receiving at the gateway server the related media content from the content server.

6. The method of claim 1, wherein the electronic program guide comprises an electronic program grid on a touchscreen device, and wherein the plurality of tiles comprises a plurality of television-show interface elements, each television-show interface element being associated with a television show being broadcast on a distribution network, each interface element being associated with at least two input commands, the method further comprising
   determining whether the input command is of a first input command type and, if so, sending a command to a set-top box associated with a television to tune the television show associated with said one of the television-show interface elements, and wherein the television comprises the first device.

7. The method claimed in claim 6, wherein sending the command to the set-top box comprises sending a channel change request to a gateway server over a wireless network.

8. The method claimed in claim 7, wherein the method further comprises identifying, at the gateway server, an address for the set-top box based upon a stored pairing between the set-top box and the touchscreen device, and transmitting a channel change command to the address for the set-top box via an operator network.

9. The method claimed in claim 6, wherein said related media content comprises video content other than the television show.

10. The method claimed in claim 6, wherein the first input command type is a single tap on the tile, and wherein the second input command type is a touchscreen gesture on the tile other than a single tap.

11. A mobile device comprising a touchscreen, a processor, memory, a communications subsystem, and a remote control application executable by the processor, wherein the remote control application, when executed, configures the processor to

- display an electronic program guide including a plurality of tiles, each tile associated with a program, each of the plurality of tiles being associated with two input commands including a first input command for initiating display of the program at a first device and a second input command comprising a related content request for initiating display at the mobile device;
- receive an input command in association with one of the plurality of tiles;
- determine that the received input command is a related content request and, in response, send a related content search query to a gateway server over a wireless network connection, the related content search query including information identifying said one of the plurality of programs;
- receive related media content search results from the gateway server in reply to the related content search query, wherein the related media content search results is associated with said one of the plurality of programs; and
- in response to receiving related media content search results, display related media content identified in the related media content search results at the mobile device, the related media content comprising a video associated with said one of the plurality of programs.

12. The mobile device claimed in claim 11, wherein the input command comprises a predefined touchscreen gesture atop the tile associated with said one of the plurality of programs.

13. The mobile device of claim 11, wherein the electronic program guide comprises an electronic program grid and wherein the plurality of tiles comprises a plurality of television-show interface elements, each television-show interface element being associated with a television show being broadcast on a distribution network, each interface element being associated with at least two input commands, wherein the processor is further configured to determine whether the input command is of a first input command type and, if so, send a command to a set-top box associated with a television to tune the television show associated with said one of the television-show interface elements, and wherein the television comprises the first device.

14. The mobile device of claim 13 wherein said related media content comprises video content other than the television show.

15. The mobile device of claim 13, wherein the first input command type is a single tap on the tile, and wherein the second input command type is a touchscreen gesture on the tile other than a single tap.

\* \* \* \* \*